(12) United States Patent
Thuo et al.

(10) Patent No.: US 11,241,678 B2
(45) Date of Patent: Feb. 8, 2022

(54) METAL OXIDE MATERIALS MADE USING SELF-ASSEMBLED COORDINATION POLYMERS

(71) Applicant: Iowa State University Research Foundation, Inc., Ames, IA (US)

(72) Inventors: Martin M. Thuo, Ames, IA (US); Boyce S. Chang, Ames, IA (US); Jiahao Chen, Evanston, IL (US); Aaron J. Rossini, Ames, IA (US)

(73) Assignee: Iowa State University Research Foundation, Inc., Ames, IA (US)

( * ) Notice: Subject to any disclaimer, the term of this patent is extended or adjusted under 35 U.S.C. 154(b) by 0 days.

(21) Appl. No.: 15/932,805

(22) Filed: Apr. 27, 2018

(65) Prior Publication Data

US 2018/0311655 A1    Nov. 1, 2018

Related U.S. Application Data

(60) Provisional application No. 62/602,666, filed on May 1, 2017.

(51) Int. Cl.
*B01J 31/16* (2006.01)
*B01J 31/22* (2006.01)
(Continued)

(52) U.S. Cl.
CPC .......... *B01J 31/1691* (2013.01); *B01J 21/18* (2013.01); *B01J 23/08* (2013.01); *B01J 31/2213* (2013.01); *B01J 35/004* (2013.01); *B01J 37/086* (2013.01); *C07F 5/003* (2013.01); *B01J 31/2239* (2013.01); *B01J 2531/004* (2013.01); *B01J 2531/32* (2013.01); *B01J 2531/33* (2013.01);
(Continued)

(58) Field of Classification Search
CPC ............ B01J 31/1691; B01J 31/2213; B01J 2531/32; B01J 2531/33; B01J 2531/42; B01J 2531/46; B01J 2531/54; C01G 15/003; C07F 5/003
See application file for complete search history.

(56) References Cited

U.S. PATENT DOCUMENTS

| 4,042,374 A | 8/1977 | Rasmussen et al. |
| 4,153,156 A | 5/1979 | Seemann et al. |

(Continued)

FOREIGN PATENT DOCUMENTS

| EP | 3322549 A1 | 5/2018 |
| WO | WO-2015/089309 A1 | 6/2015 |
| WO | WO-2017/011029 A1 | 1/2017 |

OTHER PUBLICATIONS

Reddy et al (Hydrothermal synthesis and photocatalytic property of ß-Ga2O3 Nanorods),, Nanoscale Research Letters (2015) 1o:364.*

(Continued)

*Primary Examiner* — Jun Li
(74) *Attorney, Agent, or Firm* — Schwegman Lundberg & Woessner, P.A.

(57) ABSTRACT

A method for making organo-metal material involves providing a metal ion source in a medium that removes metal ions from the source and forms 1D metal-containing coordination polymers that self-assemble and precipitate as at least one of a 2D and 3D coordination polymer material that can be thermally treated to produce a porous metal oxide material.

29 Claims, 4 Drawing Sheets

(51) Int. Cl.

| | |
|---|---|
| *C07F 5/00* | (2006.01) |
| *B01J 21/18* | (2006.01) |
| *B01J 37/08* | (2006.01) |
| *B01J 23/08* | (2006.01) |
| *B01J 35/00* | (2006.01) |
| *C25B 1/04* | (2021.01) |
| *C01B 32/40* | (2017.01) |

(52) U.S. Cl.
CPC ........ *B01J 2531/42* (2013.01); *B01J 2531/46* (2013.01); *B01J 2531/54* (2013.01); *B01J 2531/842* (2013.01); *C01B 32/40* (2017.08); *C25B 1/04* (2013.01); *Y02E 60/36* (2013.01)

(56) References Cited

U.S. PATENT DOCUMENTS

| | | | |
|---|---|---|---|
| 4,273,827 A | 6/1981 | Sweeney et al. | |
| 4,282,034 A | 8/1981 | Smith et al. | |
| 4,514,125 A | 4/1985 | Stol | |
| 4,519,866 A | 5/1985 | Stol | |
| 4,913,263 A | 4/1990 | Spiers | |
| 5,769,308 A | 6/1998 | Kokusho et al. | |
| 5,958,367 A * | 9/1999 | Ying | C01B 13/32 423/701 |
| 6,106,739 A | 8/2000 | Stephens et al. | |
| 7,476,442 B2 * | 1/2009 | Jacobson | B05D 1/00 428/403 |
| 10,124,310 B2 | 11/2018 | Thuo et al. | |
| 10,266,925 B2 | 4/2019 | Thuo et al. | |
| 2005/0250878 A1 | 11/2005 | Moore et al. | |
| 2007/0209576 A1 * | 9/2007 | Sunkara | B82Y 30/00 117/87 |
| 2008/0251164 A1 | 10/2008 | Lohwongwatana et al. | |
| 2010/0216632 A1 | 8/2010 | Adzic et al. | |
| 2010/0254890 A1 * | 10/2010 | Yang | B01J 20/28047 423/592.1 |
| 2012/0039824 A1 * | 2/2012 | Archer | B82Y 30/00 424/59 |
| 2012/0067615 A1 | 3/2012 | Blaiszik et al. | |
| 2013/0056785 A1 * | 3/2013 | Hwang | H01L 27/15 257/99 |
| 2013/0244037 A1 | 9/2013 | Hohman et al. | |
| 2016/0317992 A1 | 11/2016 | Thuo et al. | |
| 2017/0014958 A1 | 1/2017 | Thou et al. | |
| 2017/0120295 A1 | 5/2017 | Thuo et al. | |

OTHER PUBLICATIONS

Deshmane (Thermally Stable nanocrystalline mesoporous gallium oxide phases), Eur. J. Inorg. Chem. 2009, 3275-3281.*
"U.S. Appl. No. 14/999,868, Corrected Notice of Allowability dated Mar. 6, 2019", 2 pgs.
"U.S. Appl. No. 14/999,868, Final Office Action dated Jul. 20, 2018", 11 pgs.
"U.S. Appl. No. 14/999,868, Non Final Office Action dated Nov. 14, 2017", 12 pgs.
"U.S. Appl. No. 14/999,868, Notice of Allowance dated Dec. 12, 2018", 10 pgs.
"U.S. Appl. No. 14/999,868, Response filed Mar. 13, 2018 to Non Final Office Action dated Nov. 14, 2017", 7 pgs.
"U.S. Appl. No. 14/999,868, Response Filed Sep. 11, 2018 to Final Office Action dated Jul. 20, 2018", 12 Pgs.
"U.S. Appl. No. 14/999,868, Response filed Oct. 27, 2017 to Restriction Requirement dated Sep. 1, 2017", 3 pgs.
"U.S. Appl. No. 14/999,868, Restriction Requirement dated Sep. 1, 2017", 10 pgs.
"European Application Serial No. 16824809.4, Partial Supplementary European Search Report dated Jan. 4, 2019", 11 pgs.
"European Application Serial No. 16824809.4, Response filed Aug. 21, 2018 to Communication Pursuant to Rules 161(2) and 162 EPC dated Feb. 21, 2018", 14 pgs.
"International Application Serial No. PCT/US2016/000058, International Preliminary Report on Patentability dated Jan. 25, 2018", 10 pgs.
"International Application Serial No. PCT/US2016/000058, International Search Report dated Oct. 18, 2016", 4 pgs.
"International Application Serial No. PCT/US2016/000058, Written Opinion dated Oct. 18, 2016", 8 pgs.
Bowden, N., et al., "Mesoscale Self-Assembly: Capillary Bonds and Negative Menisci", J. Phys. Chem. B, 104, (2000), 2714-2724.
Bowden, N. B., et al., "Molecule-Mimetic Chemistry and Mesoscale Self-Assembly", Acc. Chem. Res., 34(3), (2001), 231-238.
Bowden, N., et al., "Self-Asembly of Mesoscale Objects into Ordered Two-Dimensional Arrays", Science New Series, 276(5310), (Apr. 11, 1997), 233-235.
Bowden, N., et al., "Self-Assembly of Microscale Objects through Lateral Capillary Forces", Langmuir, 17(5), (2001), 1757-1765.
Cadirli, E, et al., "The effect of growth rate on microstructure and microindentaiton hardness in the In—Bi—Sn ternary alloy at low melting point", Journal of Alloys and Compounds, 470(Issues 1-2), (2009), 150-156.
Dickey, M. D., "Emerging Applications of Liquid Metals Featuring Surface Oxides", Applied Materials & Interfaces, 6(21), (2014), 18369-18379.
Dickey, M. D, et al., "Eutectic Gallium-Indium (EGain) : A Liquid Metal Alloy for the Formation of Stable Structures in Microchannels at Room Temperature", Adv. Funct. Mater., 18(7), (2008), 1097-1104.
Ferguson, Gregory S, "Contact Adhesion of Thin Films on Elastomeric Supports: Cold Welding Under Ambient Conditions", Science, 253(5021), (1991), 776-778.
Gao, Fan, et al., "Effect of surface oxide on the melting behavior of lead-free solder nanowires and nanorods", Applied Surface Science, 258(19), (2012), 7507-7514.
Gao, Fan, et al., "Synthesis, Characterization, and Thermal Properties of Nanoscale Lead-Free Solders on Multisegmented Metal Nanowires", J. Phys. Chem.C, 113(22), (2009), 9546-9552.
Garnett, Erik C., et al., "Self-limited plasmonic welding of silver nanowire junctions", Nature Materials, 11(3), (Mar. 2012), 241-249.
Herlach, D. M., "Containerless Undercooling and Solidification of Pure Metal", Annu. Rev. Mater. Sci., 21, (Aug. 1991), 23-44.
Holland-Moritz, D, et al., "Short-range order of stable and undercooled liquid titanium", Materials Science and Engineering A vol. 449-451, (Mar. 25, 2007), 42-45.
Hutter, T., et al., "Formation of Spherical and Non-Spherical Eutectic Gallium-Indium Liquid-Metal Microdroplets in Microfluidic Channels at Room Temperature", Adv. Funct. Mater. 22(12), (2012), 2624-2631.
Ismagilov, Rustem F, et al., "Autonomous Movement and Self-Assembly", Angew. Chem. Int. Ed., 41(4), (2002), 652-654.
Kato, Hidemi, et al., "Surface-activated supercooled liquid brazing", Scripta Materialia, 68(9), (2013), 699-702.
Kim, Changsoon, et al., "Fabrication of Organo Light-emitting Devices by Low Pressure Cold Welding", Adv. Mater. Sci., 15(6), (2003), 541-545.
Koppes, J. P, et al., "Utilizing the thermodynamic nanoparticle size effects for low temperature Pb-fee solder", Materials Science and Engineering B, 177, (2012), 197-204.
Laza, S. C., et al., "Selective Cold Welding if Colloidal Gold Nanorods", Part. Syst. Charact., 30(7), (2013), 584-589.
Li, Xiaopeng, et al., "Nanwire Joining Methods", The Open Science Journal, 3, (2011), 91-104.
Lu, Yang, et al., "Cold Welding of ultrathin gold nanowire", Nature Nanotechnology, vol. 5, (Mar. 2010), 218-224.
Mullis, A. M., et al., "The solidification of undercooled melts via twinned dendritic growth", Materials Science and Engineering A, 375-377, (2004), 547-551.
Parravicini, G. B, et al., "Extreme undercooling (down to 90K) of liquid metal nanoparticles", Appl. Phys. Lett., 89, 033123, (2006), 3 pgs.
Patra, Debabrata, et al., "Fabrication of Conductive Microcapsules via Self-Assembly and Crosslinking of Gold Nanowires at Liquid-Liquid Interfaces", Small, 6(13), (2010), 1402-1405.

(56) References Cited

OTHER PUBLICATIONS

Peng, Yong, et al., "Bottom-up Nanoconstruction by the Welding of Individual Metallic Nanoobjects Using Nanoscale Solder", Nano Leltters, 9(1), (2009), 91-96.

Perepezko, J H, et al., "Undercooling and solidfication of atomized liquid droplets", Materials Science and Engineering, A326, sebright, (2002), 144-153.

Perepezko, J. H., "Nucleation in Undercooled Liquids", Materials Science and Engineering, 65(1), (1984), 125-135.

Perepezko, J. H., et al., "Undercooling Behavior of Liquid Metals", Materials Research Society Symposia vol. 8, Symposium F—Rapidly Solidified Amorphous and Crystalline Alloys, (1982), 49-62.

Qi, W H, "Size and shape dependent melting temperature of metallic nanoparticles", Materials Chemistry and Physics 88, (2004), 280-284.

Shen, Lu, et al., "Nanoindentation study on creep resistance of SnBi solder ally with reactive nano-metallic fillers", Materials Science & Engineering, A, 561, Tan, (2013), 232-238.

Sivan, Vijay, et al., "Liquid Metal Particles", Adv. Funct. Mater. 23(2), (2013), 144-152.

Suganuma, Katsuaki, "Advances in lead-free electronics soldering", Current Opinion in Solid State and Material Science, 5(1), (2001), 55-64.

Sun, Z, et al., "The Application of Electron Beam Welding for the Joining of Dissimilar Metals: An Overview", J. of Material Processing Technology, 59(3), (1996), 257-267.

Tevis, I. D, et al., "Synthesis of Liquid Core-Shell Particles and Solid Patchy Multicomponent Particles by Shearing Liquids Into Complex Particles (SLICE)", Langmuir, 30, (2014), 14308-14313.

Thuo, M. M., et al., "Odd-Even Effects in Charge Transport acorss Self-Assembled Monolayers", J Am Chem Soc., 133(9), (2011), 2962-2975.

Wagle, Durgesh V., et al., "Cold welding: a phenomenon for spontaneous self-healing and shape genesis at the nanoscale", Materials Horizizon, 2, (2015), 157-167.

Weiss, E. A, et al., "Si/SiO2-Templated Formation for Ultraflat Metal Surfaces on Glass, Polymer, and Solder Supports: Their Use for Self-Assembled Monolayers", Langmuir, 23(19), (2007), 9686-9694.

Witusiewicz, V T, et al., "Thermodynamic re-optimisation of Bi—In—Sn system bsed on new experimental data", Journal of Alloys and Compounds, 428(Issues 1-2), (2007), 115-124.

Wolfe, D. B., et al., "Mesoscale Self-Assembly: Capillary Interactions When Positive and Negative Menisic Have Similar Amplitudes", Langmuir, 196), (2003), 2206-2214.

Zhou, Y, et al., "From Microjoining to Nanojoining", The Open Science Journal, 3, (2011), 32-41.

Zuo, Yong, "Evolution of Microstructure Across Eutectic Sn—Bi Solder Joints Under Simultaneous Thermal Cycling and Current Sensing", Journal of Electronic Materials, 44(1), (2015), 597-603.

Chang, Boyce S., et al., "Ambient synthesis of nanomaterials by in situ heterogeneous metal/ligand reactions", Nanoscale,11, (Jul. 9, 2019), 14060-14069.

Chang, Boyce S., et al., "Ambient Synthesis of Nanomaterials by in situ Heterogeneous Metal/Ligand reactions", Electronic Supplementary Material (ESI), Nanoscale, 11, (c) The Royal Society of Chemistry 2019, (2019), 23 pgs.

Chang, Boyce S., et al., "Synthesis of Interface-Driven Tunable Bandgap Metal Oxides", Supporting Information, ACS Materials Lett., 2, (2020), 12 pgs.

Chang, Boyce S., et al., "Synthesis of Interface-Driven Tunable Bandgap Metal Oxides", ACS Materials Lett. 2, (2020), 1211-1217.

\* cited by examiner

Fig. 2A
Fig. 2B
Fig. 2C
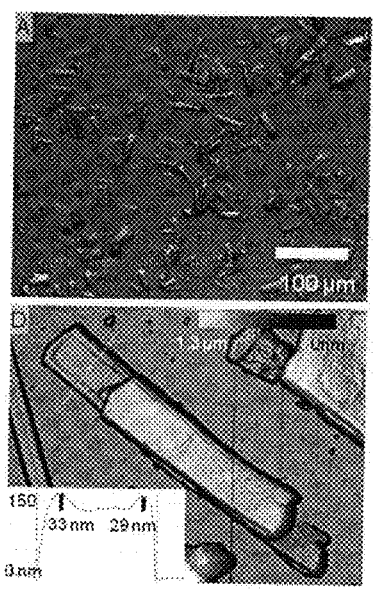
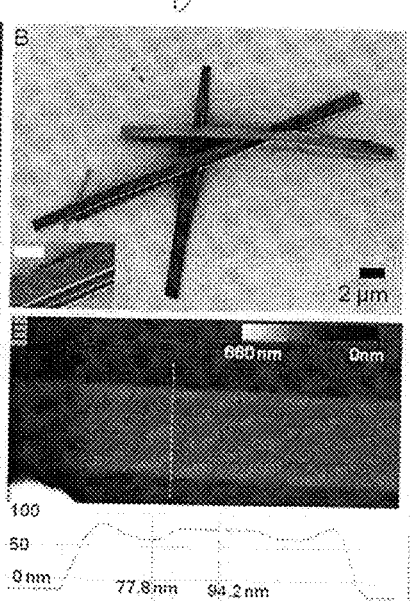
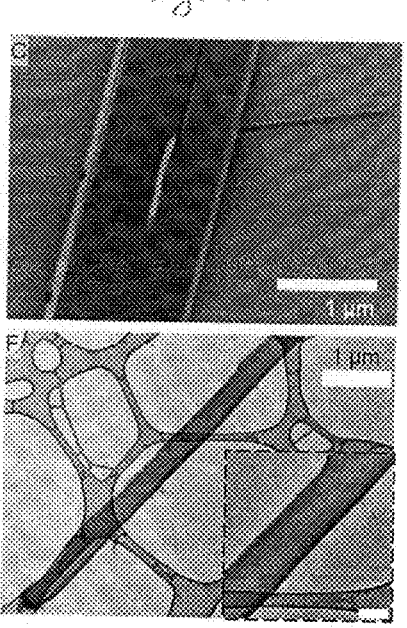
Fig. 2D
Fig. 2E
Fig. 2F

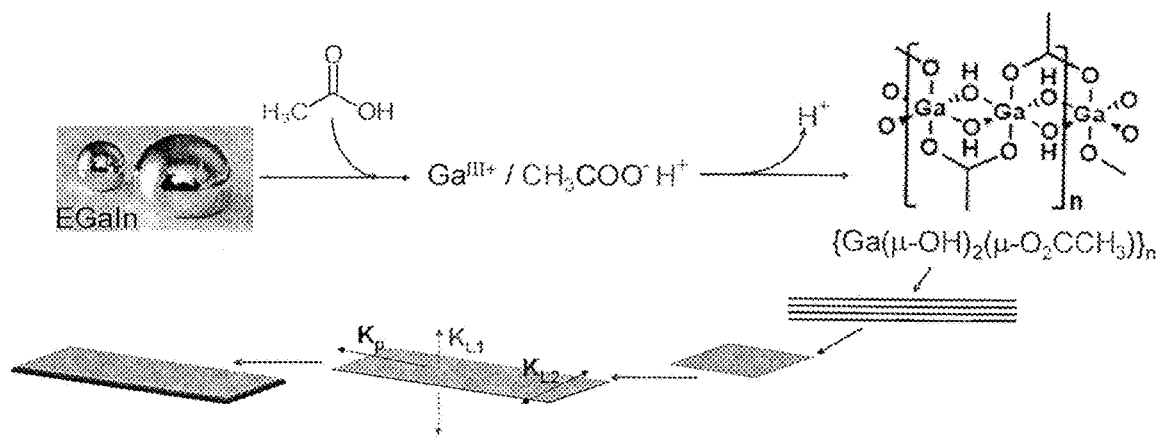
FIG. 3
FIG. 4
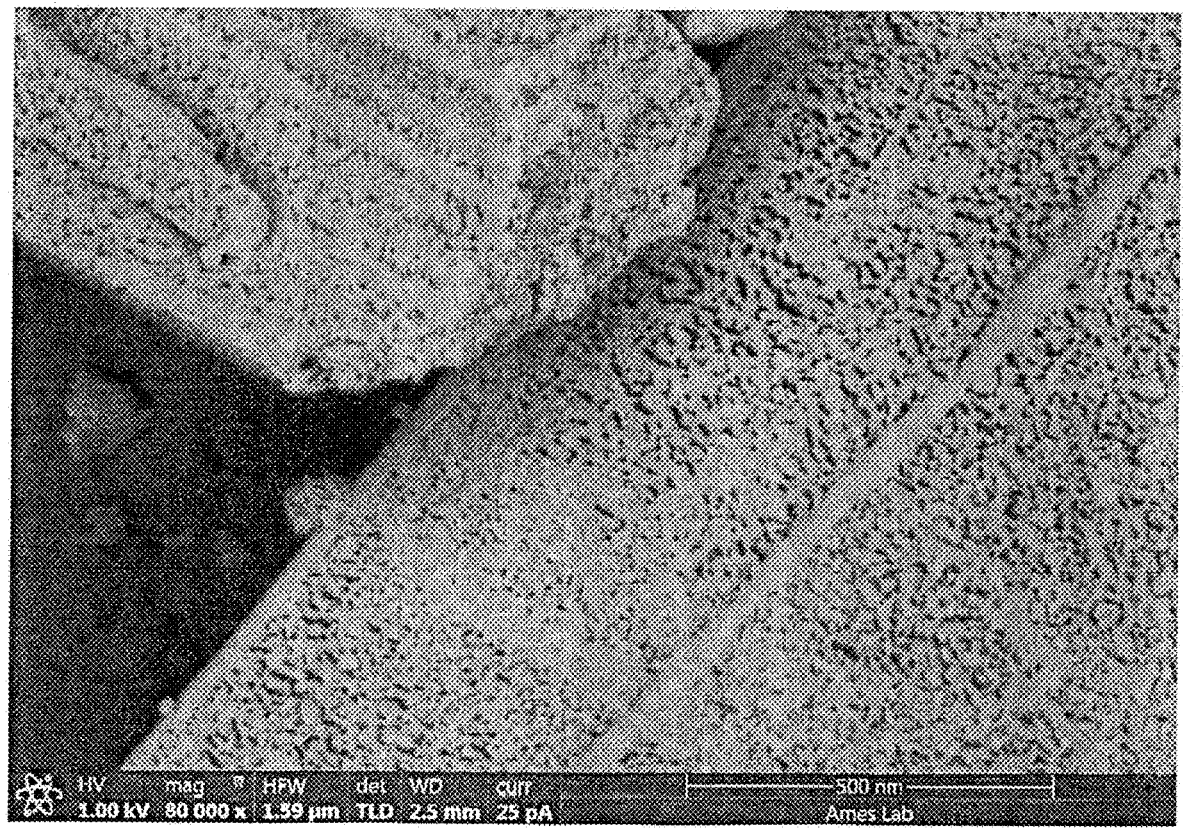

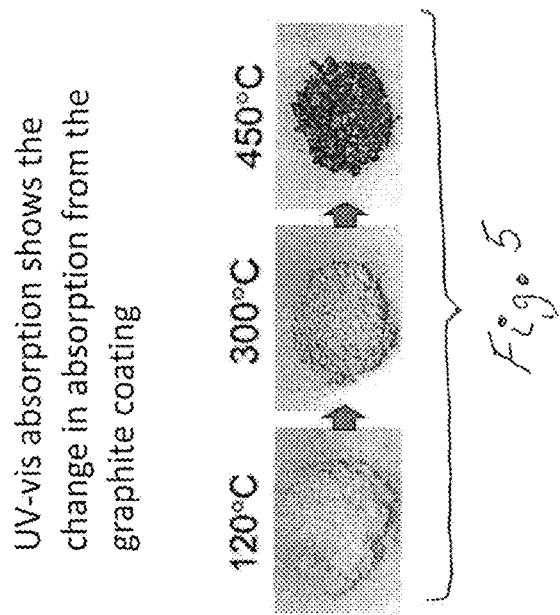
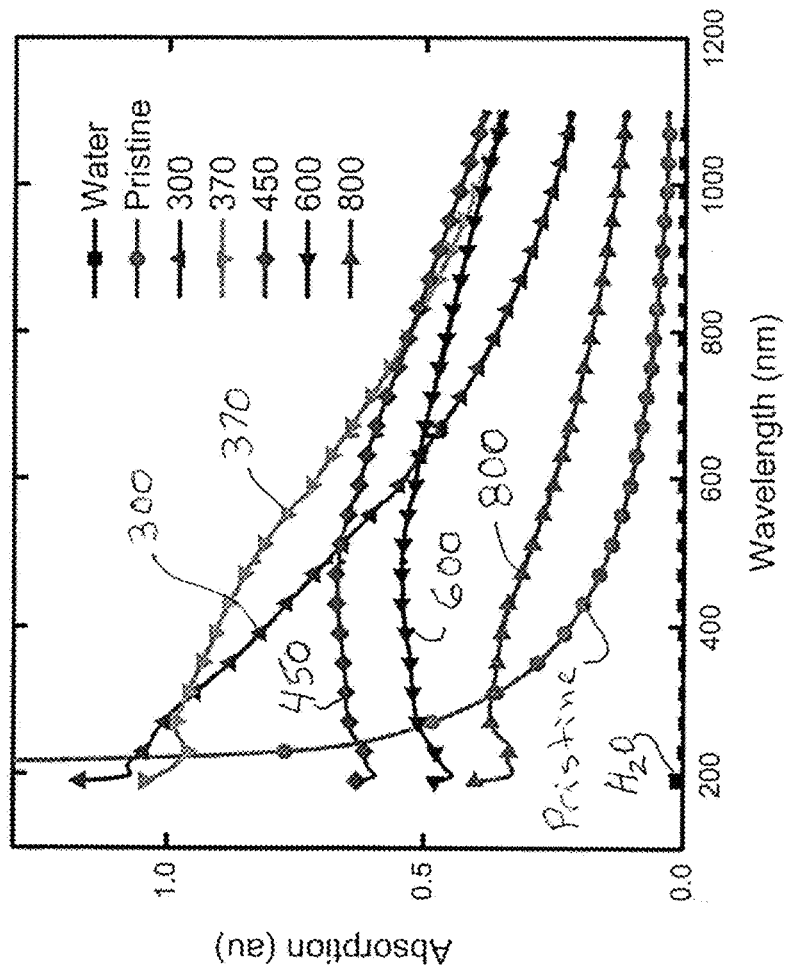

METAL OXIDE MATERIALS MADE USING SELF-ASSEMBLED COORDINATION POLYMERS

RELATED APPLICATION

This application claims benefit and priority of U.S. provisional application Ser. No. 62/602,666 filed May 1, 2017, the disclosure and drawings of which are incorporated herein by reference.

FIELD OF THE INVENTION

The present invention relates to a method of making high surface area, organo-metallic structures that involves coordination polymer templated synthesis of certain metal oxides and metal compounds, such as for example $Ga_2O_3$, that can be thermally treated to provide porous structures that can include a carbon-containing coating on surfaces thereof.

BACKGROUND OF THE INVENTION

Advances have been made in the area of photocatalytic (PC) and photoelectrochemical (PEC) water splitting using $TiO_2$ photo-catalysts. However, $TiO_2$ photo-catalysts are far from being commercialized due to expensive synthesis techniques. As a result, other material systems have been explored for potential commercialization. One such system is $Ga_2O_3$.

$Ga_2O_3$ is a wide bandgap semiconductor that can adopt five different crystal structures. Among these structures, $\beta$-$Ga_2O_3$ is the most stable. Its conduction band edge is located at −7.75 eV vs vacuum and its valence band edge is at −2.95 eV vs vacuum. These band edge positions make $\beta$-$Ga_2O_3$ favorable for oxidation and reduction of water. Its bandgap is 4.9 eV, which absorbs light in the deep UV range[19-20]. Furthermore, $\beta$-$Ga_2O_3$ can be doped, which can facilitate tuning of the bandgap of the material. Thus, light absorption and hence, the performance of the photoelectrode can be controlled with the help of doping. It is reported $\beta$-$Ga_2O_3$ photoelectrodes are more corrosion resistant when performing the PEC water splitting reaction[21-24]. Due to these advantages, interest in this material system has been increasing. The performance of $\beta$-$Ga_2O_3$ has been studied via the photocatalytic (PC) and PEC techniques. Literature reports have demonstrated an efficient PC degradation of salicylic acid under UV illumination by $\beta$-$Ga_2O_3$[25]. Further, stoichiometric splitting of water was shown by $\beta$-$Ga_2O_3$ when loaded with nickel oxide (NiO) under UV irradiation[21]. Also single crystal $\beta$-$Ga_2O_3$ has exhibited stoichiometric generation of $H_2$ and $O_2$ via PEC water splitting[26]. Reports in literature have shown that $\beta$-$Ga_2O_3$ was used as a photocatalyst with photocathodes like copper (I) oxide ($Cu_2O$), exhibiting a high cathodic current of −2.95 mA/cm$^2$ at 0 V vs Reversible hydrogen electrode (RHE) and a high positive onset potential of 1.02 V vs RHE[27]. The $\beta$-$Ga_2O_3$ has also been used as an underlayer to improve the performance of a hematite photoanode[28]. The improved performance of $\beta$-$Ga_2O_3$ has been mainly attributed to improved crystallinity, better band alignment and the use of catalyst. Doping is another aspect, which has been employed to improve efficiency and tune the bandgap of $\beta$-$Ga_2O_3$. The doping with zinc (Zn), tin and silicon has shown promising PEC properties in $\beta$-$Ga_2O_3$[29-30]. Reports in literature have suggested that doping with Zn helps in the removal of trap states close to the conduction band but introduces acceptor levels, which helps in the concentration and mobility of holes[31]. Recently, it has also been demonstrated that a $\alpha$-$\beta$ phase junction in $Ga_2O_3$ has improved photocatalytic activity by increasing the lifetime of photogenerated electrons[22]. However, the $\alpha$-$\beta$ phase junction in $Ga_2O_3$ must be exposed on the surface for any photocatalytic enhancement to occur. Thus from the literature, it is clear that trapping states are mainly responsible for lower PC or PEC activities of $Ga_2O_3$. This issue has been approached by improving crystallinity, using dopants and by attempting to synthesize $\alpha$-$\beta$ phase junction in $Ga_2O_3$. However, drastically increasing the surface area to volume ratio where almost the entire material is exposed to the electrolyte by forming a nanoscale porous network has the potential to greatly enhance the photocatalytic activity. The nanoporous structure will promote the entire material to participate in the PC or PEC reaction. This approach of forming highly porous nanostructures has not been the main focus of studies in the literature.

Several morphologies of $\beta$-$Ga_2O_3$ like nanowires[32], nanorods[33], nanobelts[34] and nanoribbons have been fabricated.[35] These forms are all solid nanostructures with no possibility of forming porous networks. Further, these $\beta$-$Ga_2O_3$ nanostructures are obtained by techniques like arc-discharge, carbon thermal reduction, vapor-liquid-solid method, thermal oxidation and laser ablation. All of these mentioned techniques are expensive, require sophisticated equipment, and require an accurate control of process variables like pressure and temperature. Thus, to avoid expensive synthesis techniques, which do not form porous nanostructures, chemical routes have gained attention. These chemical synthesis methods are carried out under milder experimental conditions and have successfully synthesized nanocrystals, nanoparticles, nanorods, etc. for either PC or PEC water splitting.

It is important to note that in some PEC studies, the poor performance of $\beta$-$Ga_2O_3$ was attributed to disordered or defective structures, which can act as recombination centers[36]. Also, all $\beta$-$Ga_2O_3$ PEC samples have been synthesized by using complicated synthesis techniques as mention above.

There is a need for a synthesis technique which is more simple and less expensive.

SUMMARY OF THE INVENTION

Embodiments of the present invention provide a synthesis technique to this end to fabricate nanoporous $\beta$-$Ga_2O_3$ and other metal compounds with tunable porosity and high crystal quality using self-assembled organo-metal material.

Embodiments of the present invention involve making organo-metal material by providing a metal ion source in a medium that removes metal ions from the source and forms 1D metal-containing coordination polymers that self-assemble and precipitate as at least one of a 2D and 3D coordination polymer material that can be thermally treated to produce a porous metal oxide material.

In other embodiments of the present invention, a method for forming the organo-metal material involves reacting metal particles in an aqueous acidic medium to form polymerizable metal-containing species and growing by coordination polymerization metal-containing polymers that self-assemble and precipitate as an organo-metal material that can be thermally treated to produce a porous oxide structure that can be used as a photo-catalyst, coating, or a colored material.

The method is useful to form certain organo-metal coordination polymer materials based on metal compounds such as including, but not limited to, coordinating metal oxides, metal-chalcogen, metal-pnictogen, and metal-boron that are soluble in the acetate form.

A particular illustrative embodiment of the present invention involves a method comprising shearing liquid metal particles in aqueous acidic medium to: (i) selectively form thin metal oxide-acetate layer on the surface of the particles through oxidation of metal, (ii) dissolve the oxide-acetate layer into the aqueous acidic medium to provide dissolved polymerizable metal-acetate ionic species, and (iii) grow from the metal-acetate ionic species coordination polymers that self-assemble and precipitate as the organo-metal structure materials.

Illustrative embodiments of the present invention can produce long, rigid and highly porous $\beta$-$Ga_2O_3$ and other metal oxide beams, which are easy to handle and in some cases do not require a supporting substrate. Such self-supported $\beta$-$Ga_2O_3$ and other oxide beams can be utilized for PC and PEC water splitting, along with $CO_2$ reduction to CO.

The present invention also envisions a material comprising a metal-containing coordination polymer material having a carbon-containing layer, such as graphite and/or graphene, formed on surfaces wherein the color, absorptivity, and electrical conductivity of the material can be tuned by heat treatment under anaerobic conditions that promote incomplete ablation of the organic ligands (e.g. acetate ligands) to form the carbon-containing layer on external and internal surfaces as well as to increase porosity of the material.

Other advantages and details of the invention will become apparent from the following detailed description taken with the following drawings.

BRIEF DESCRIPTION OF THE DRAWINGS

FIG. 2A-2F provide light microscopy (FIG. 2A); SEM images (FIGS. 2B and 2C); and ATF images (FIGS. 2D and 2E; and TEM image (FIG. 2F) of $Ga_2O_3$ nanobeams.

FIG. 3 shows a schematic diagram of synthesis of the $Ga_2O_3$ nanobeams.

FIG. 4 is a high resolution SEM image of a porous $Ga_2O_3$ nanobeam.

FIG. 5 shows the color changes (white to dark gray/black) of samples anaerobically (argon atmosphere) heat treated at temperatures of 120° C., 300° C., and 450° C.

FIG. 6 is a graph of UV-vis absorption versus wavelength for polymer samples anaerobically (argon atmosphere) heat treated at temperatures of 300° C. to 800° C. showing the change in absorption from formation of graphitic coating. The pristine sample is not heat treated.

DETAILED DESCRIPTION OF THE INVENTION

Figure 1:
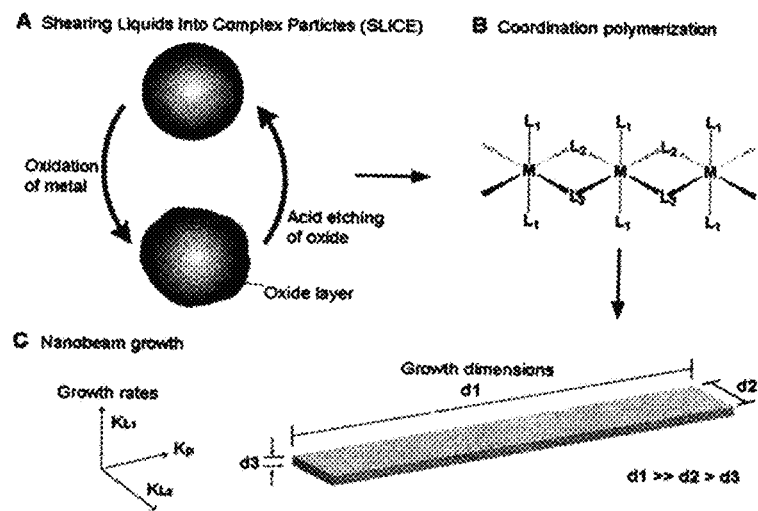
FIG. 1 is a schematic diagram of an illustrative method embodiment of the present invention where $L_1$ and $L_2$ are ligands and M is a metal cation selected from the group consisting of gallium, indium, bismuth, tin, iron, titanium or other metal that can complex with bidentate ligands to form coordination polymers. Polymer growth rates in the various dimensions shown are designated as $K_p$, $K_{L1}$, and $K_{L2}$.

An embodiment of the present invention is described below for purposes of illustration and not limitation with respect to fabrication of a high surface area, organ-metal photo-catalyst based on coordination polymer templated synthesis of $Ga_2O_3$. This method is based on synthesis of 1D (one dimensional) coordination polymers followed by their controlled self-assembly in situ, and eventual thermal ligand annihilation of the organic ligands to form the oxide photo-catalyst. The amorphous oxide then slowly crystalizes to give well-ordered polymorphs based on the extent of the thermal treatment. Varying the synthesis process will give well-ordered oxide crystals for efficient photocatalysis.

Embodiments of the present invention involve making organo-metal material by providing a metal ion source in a medium having a composition that removes metal ions from the source and forms 1D metal-containing coordination polymers that self-assemble and precipitate as at least one of a 2D and 3D coordination polymer material that can be thermally treated to produce a porous metal oxide material. The composition of the medium is selected in dependence on the metal ion source to this end.

For purposes of further illustration and not limitation, embodiments of the present invention involve a non-traditional solution-based method for producing 1D coordination polymers from metal particle droplets as a source of metal ions in a solution medium. Solubility-driven in situ self-assembly gives high aspect ratio 2D (two dimensional) and 3D (three dimensional) materials (FIG. 1). A method embodiment exploits: i) presence of a passivating oxide layer and ability of liquid metal surfaces to undergo plastic deformation, and hence reconstruct upon etching of the passivating layer, ii) potential of liquid metal droplets to serve as versatile metal ion reservoir or source in coordination polymerization, iii) kinetically resolved selective oxidation of metal alloy components leading to dominance of the surface by most reactive component, iv) the ability of a conjugate acid-base pair ($H_3O^+$ and $RCOO^-$) to serve as an etchant and a ligand, respectively, v) controlled solubility ($\Delta G_m$) and equilibrium (Le Chatelier's principle and common ion effect) to maintain steady state kinetics, vi) in situ ligand-directed polymerization-induced self-assembly (PISA), vii) control over the primary coordination sphere to direct inter-chain secondary bonding hence tune the PISA process, viii) stoichiometry driven two-metal chelation by the conjugate base, and ix) selective ablation of the hydrocarbon to create a mesoporous high-aspect ratio nanostructured metal oxide. By maintaining the assembled organo-metal material in the solution medium, ad infinitum polymer growth is effected providing a versatile method to fabricate high aspect ratio materials. Solvent molecules of the solution can be included in the assembled organo-metal structure. Practice of the present invention allows control over the dimensions of the structure, with potentially diverse uses. Gallium ions, derived from eutectic gallium indium (EGaIn), are used in the examples below for purposes of illustration and not limitation, in part due to challenges in synthesis of nanostructured gallium oxide and potential wide applications. Mesoporous gallium oxide, for example, has shown high catalytic activity for selective photo-reduction of $CO_2$. Gallium oxide is also an important material for large bandgap 4.8-4.9 eV semiconductors.

For purposes of further illustration and not limitation, the metal of the metal ion source (e.g. metal particles) can comprise gallium, indium, bismuth, tin, iron, titanium and/or other metals and/or alloys that can complex with bidentate ligands to form coordination polymers wherein the term "metal" includes metal(s), metal alloy(s) and other metal-containing material(s). The metal particle can be a liquid metal core-shell particle, a solid, semi-solid or liquid metal or metal alloy material, and/or a metal composite material. Moreover, each metal particle can be a particle having an oxide layer that is etched by a component of the solution medium to form the 1D metal-containing coordination polymers wherein the etchant can be an acid, base or a derivative of a conjugate acid-base pair. The conjugate acid-base pair can be a source of the etchant and a ligand (chelating agent) wherein the conjugate acid-base pair is derived from carboxylic acid such as acetic acid, benzoic acid, propionic acid or other carboxylic acids; protonated amines, analogous, or any other combined system capable of dissociating to give an electron-poor adduct and an electron rich adduct.

The 3D coordination polymer material that is produced can include multiple different metal centers, either forming as a component of the same or different coordination polymer chains wherein the metal ions are derived from the same or different metal ion sources (same or different metal particles). Upon thermal treatment described below, the polymer yields a mixed metal oxide material wherein the mixed metal oxides are used to tune the band gap, band structure, or color of the thermally treated material.

Moreover, different metal centers can be assembled in a uniform manner across the structure leading to uniformity in their effect on the band structure of the thermally treated material. A stochastically ordered material can be produced that is characterized by different regions of the material having a different photo-catalytic or different semi-conducting property. Moreover, in the self-assembly process, two dissimilar ligands can be bonded orthogonal to each other in a square bipyramidal geometry around the metal center, wherein the two dissimilar ligands interact via two different types of secondary bonds that can include, but are not limited to, hydrogen bonds and van der waals interactions (Keesom, Debye or London dispersive forces) or any combination of such forces.

The porosity of the resulting thermally treated material can be tuned from nano- to meso-scale dimensions. Multiple levels of porosity can be realized such that nanometer pores are localized on sintered/coalesced regions of the material while larger pores are localized near sintered/coalesced domains. The porosity of the thermally treated material can be a 3D interconnected porous network. The porosity can be tuned through degree of sintering/coalescence leading to oxide domains in the nano- to micro-scale in length.

Moreover, the self-assembly process can be tuned through organization of the coordination sphere leading to self-assembly of a 3D high aspect material of different shape. The synthesis product can be a beam-like material with a square, rectangular, or other cross-section, which can be thin enough to be considered to have a sheet morphology. Moreover, a single layer of the beam-like material can be isolated as a 2D material or film.

In the self-assembly, the coordination geometry around the metal center can be square bipyramidal, trigonal bipyramidal or other geometries such that resulting directionality of secondary bonds between the ligands induce a different shape. The rate of self-assembly is governed by the secondary bonds formed between peripheral moieties of the ligands such that differential strength in these bonds leads to control over the cross-sectional shape of a resulting 3D beam. The self-assembled organo-metal structure can have multiple metal centers, either forming as a component of the same or different coordination polymer chains, wherein the metal centers are derived from a same or different metal ion sources (metal particles).

In the examples below, various polymorphs of $Ga_2O_3$ can be obtained through directed assembly of in situ generated 1D coordination polymers containing Ga where the nature of the ligands on a bipyramidal Ga center can be controlled and thereby used to direct the ensuing assembly of 1D coordination polymer structures. A kinetic controlled process is envisioned that would lead to nanostructured, self-assembled Ga coordination polymers. As a source of metal ions to form 1D polymer chains, particular core-shell (metal core/oxide shell/acetate) particles are used in acidic solution, such as carboxylic acid solution, in which the passivating oxide shell of metal particles constantly dissolve and regenerates, hence serves as a metal-ion (monomer) source ("buffer") that keeps reagent concentration constant, which is a key requirement in controlled polymerization. This buffering effect establishes steady state concentration of the monomer driven by etch rate (removal-regeneration balance), the buffering effect of the acetate-acetic acid equilibrium, limits in solubility, rate of polymerization, and the self-assembly process. Since the polymerization of the ligands leading to controlled self-assembly of the 1D (one dimensional) polymers into 2D (two dimensional) or 3D (three dimensional) structures. The coordination geometry is controlled through stoichiometry, stereo-electronic structure or other established organometallic chemistry tools/approaches.

FIGS. 1 and 3 schematically illustrate synthesis embodiments and the several rate parameters that are varied to control beam structure. For purposes of illustration and not limitation, liquid metal core-shell EGaIn particles are etched with aqueous acetic acid at room temperature and pressure. Dissolution of the oxide layer results in high concentration of $Ga^{3+}$ cations that chelate with the conjugate base to an acetate complex. A stoichiometric imbalance in the acetate-$Ga^{3+}$ ratio necessitates coordination of the ligand to two metal centers whose solubility significantly decreases with increased growth. Ligand-directed in situ PISA ensues leading to precipitation of the growing polymer chains into high aspect-ratio nanobeams. Polymerization directs growth of the nanobeams in one direction, $d_1$, while the growth in the other directions is driven by asymmetry in anti-periplanar moieties across the coordination center. Growth rates in various directions are designated $K_p$, $K_{L1}$, and $K_{L2}$ in FIGS. 1 and 3. Control over the 3D structure of the nanobeams can therefore be achieved by controlling the duration of the reaction and changing of the structure of the monomer (the ligand and metal ion). In FIG. 1, the three-step polymerization of self-assembled coordination polymers is illustrated wherein $L_1$ and $L_2$ are bridging acetate ($OC_2CH_3$) and hydroxyl (OH) ligands based on the composition of the solution employed. According to this structure, hydroxyl and acetate groups are expected to form secondary interactions in the $d_2$ and $d_3$ directions which dictate the shape of the material.

The examples herein employed EGaIn particles produced by the SLICE technique.[57], the disclosure of which is incorporated herein by reference This process involves employing moderate fluidic shearing to divide a macroscopic drop of liquid EGaIn (75 wt % Ga-25 wt. % In eutectic alloy) into micro- and nanoparticles in the liquid medium consisting of aqueous acidic acid solution (5% v:v) under ambient conditions. At ambient conditions EGaIn, and hence these particles, form a thin oxide shell which reacts with the acid to give an acetate coating over a metal core-oxide shell structure.[58-61] The particles are typically stored in ethanol and are stable for months. Particles stored in the reaction solution without washing, however, did not exhibit the same stability over time. Over the course of several days, the suspended EGaIn particles settle and the solution slowly turns to a turbid white color. Optical microscopy images of the product, FIGS. 2A-2C, shows formation of nanobeam structures, that upon further characterization (NMR, XRD, XPS, FTIR and EDS) were shown to contain gallium and chelated bridging acetate. A three-step reaction for formation of these organo-gallium structure from EGaIn particles in acetic acid solution is envisioned: (i) Selective formation of thin gallium oxide-acetate layer on the surface of particles through oxidation of metal, (ii) dissolution of the oxide-acetate layer into the aqueous acidic medium, (iii) 1D coordination polymerization of the organometallic units (monomers) followed by self-assembly controlled precipitation of formed organo-metal structures.

SLICE Technique:

The SLICE (Shearing Liquids Into Complex Particles) technique was used for production of eutectic gallium indium (EGaIn) particles.[57] Eutectic gallium indium alloy was mixed with 5% acetic acid. A rotary tool, such as a Dremel tool or a blender, was used as the shearing apparatus. Rotational speeds can be varied between 5000 and 11600 rpm using a variable transformer. The shearing process was varied from 5-30 min at room temperature in air. The created particles had size ranging from a few hundred nano-meters to a few hundred micrometers.

The preparation of the small metal particles is not limited to SLICE process, since any method that increases the surface area of the metal can be used. The small sized particles are only needed to increase that rate of reaction but the synthesis still works, albeit slower, with larger chunks or bodies of metal of any shape.

The particles then were incubated for at least 72 hours in static acetic acid solution to allow supersaturation of solution with dissolved metal-acetate ions followed by slow-growth of 1D coordination polymers and their assembly into 2D and 3D structures. Self-assembly can occur due to solubility ($\Delta Gm$) and/or a polymerization-induced self-assembly (PISA) process, Self-assembled 1D polymers chains were characterized, then heat treated to remove the organic ligands and thereby form mesoporous $\beta$-$Ga_2O_3$. When EGaIn metal alloy is exposed to air it is well known that the component gallium is preferentially oxidized over indium primarily because of its high reactivity to oxygen at room temperature ($M^{3+}$ (aq)+3$e^-$→M (s), $E_{red}^0$≈0.56 for Ga and 0.34 for In) and also its greater mass percentage. Formation of gallium-acetate layer over EGaIn particles is well studied. Oxides are known as practically insoluble in neutral solutions; however, their solubility increases as pH decreases. The 5% acetic acid solution (corresponding to pH of around 3.5) slowly etches rough 'as-formed' gallium oxide on the surface of the EGaIn particles resulting in very smooth surface layer. As the thin oxide is removed by the acid, a fresh area of metal is exposed to water and air and subsequently oxidizes. The EGaIn particle provides a large reservoir or source of metal ready to react and form more oxide; the oxide is hence passivating. As the oxide rapidly forms and then slowly etches, the soluble gallium content in the solution slowly increases. Assuming that the solution consists of only saturated gallium oxy-hydroxide in water at 25° C., $Ga^{3+}$ cation is the dominant ion in the solution at pH≈3.5 (corresponding to pH of 5 vol % acetic acid aqueous solution) according to the hydrolysis product distribution reported by Baes and Mesmer.[62] High solubility of gallium oxide in acidic solution allows the dissolution of the oxide layer. The soluble gallium cations concentration increases until precipitation initiates, hence removal of some $Ga^{3+}$ from solution, allowing for steady-state growth of the polymer. Even after precipitation, the polymer material continue to grow in the solution over time to form high aspect ratio 3D coordination polymer material. When the resulting suspension was purified by ethanol washes and centrifugation or filtration, then characterized by light microscopy, scanning electron microscopy (SEM), atomic force microscopy (AFM), and transmission electron microscopy (TEM), high aspect ratio nanomaterials were observed (FIGS. 2A-2F) confirming the efficacy of the method.

Results:

Under a light microscope transparent rectangular beams are observed. The beams have an average length of ≈31.0 µm±10.2 µm wide and have an average width of ≈7.4±2.8 µm for a one-week growth period. When the beams were allowed to form over a shorter period of time (3-4), SEM images showed beams size that are 12.5±6.8 µm long and 0.62±0.40 µm wide. At higher magnification, SEM (inset FIG. 2B) shows that these beams are comprised of stacked layers that lie parallel to the long axis of the beams and corresponds to an actively growing plane (see stair-like structure), which suggests that the sheets are actively growing even after self-assembly and this is attributed to the polymerization ($K_p$ in FIG. 1). The beams end abruptly at right angles and fracture propagates only along the longest dl axis. Topography of the beams cast onto a silicon wafer was analyzed by AFM (FIGS. 2D and 2E), which shows that thinner beams are flexible and can curl at the edge along the long axis (growth direction $d_1$) of the beam upon exposure to the electron beam due to resistive heating and concomitant decomposition of the organic ligands. The AFM images also show that the beams can be between 30 nm and 350 nm in height (FIG. 2D) and the beams have layers (FIG. 2E). These layers can be large (step-size of around 170 nm in the beam) or small (the smallest step-size observed was 11.4 nm). A closer examination of the nanobeams with a transmission electron microscope reveals that they are smooth and continuous in their internal structure (FIG. 2F). It was observed that thicker nanobeams curled into distorted structures under high-energy electron beam, presumably due to resistive heating. Concentrated samples of these nanobeams form mats that can be readily handled as they can be several mm thick and rigid. Elemental analysis of the mat of nanobeams using EDS shows the presence of gallium, oxygen, and carbon. Overall microscopic characterization of the nanobeam structures evidence 1D polymerization and preferential growth of structures in one direction and in situ self-assembly.

Chemical characterization of fabricated nanobeam by ATR-FTIR, XPS, coupled TGA-IR-MS, and multi-nuclear ($^1$H, $^2$H, $^{13}$C and $^{71/69}$Ga) solid state NMR indicated that the nanobeams were self-assembled products of the coordination of the etched Ga with acetic acid, with two bridging OH's that bear both a covalent and dative bonds across the bridges. From these data, the nanobeams were inferred to be coordination polymers of structure; {Ga(µ-OH)$_2$(µ-O$_2$CCH$_3$)}$_n$.

Thermal Decomposition and Subsequent Structural Integrity and Uses: To test the ability to controllably remove the organic ligands from the intermediate coordination polymer material, the nanobeams were subjected to a coupled TGA-IR-MS with temperatures up to 800° C. in argon, and the evolved gas was simultaneously analyzed by FTIR and mass spectrometry (MS). The nanobeams become crystalline $\beta$-$Ga_2O_3$ at about 800° C. Additional differential scanning calorimetry was performed.

The nanobeam structures were observed to retain their overall shape, even after heat treatment to 1000° C., and do not sinter together into one mass. An examination of the heat treated nanobeams revealed their nanoporous nature, FIG. 4. After conversion of nanobeams to $\beta$-$Ga_2O_3$, Branauer Emmett Teller (BET) surface area was measured to be ≈65 m²/g (with mesopores of around 2 nm and 10 nm radii), which is the highest surface area reported for β-$Ga_2O_3$ so far. Their highly porous nature and large surface area make them ideal for use as metal oxide catalysts and where needed in tunable bimodal porosity to allow for size-exclusion separation of potentially interfering adventitious contaminants. The heat treated nano-beams showed tunable absorptivity over a wider range of light wavelengths. Moreover, the color of the nano-beams changed from light brown or yellowish to a darker brown over the range of wavelengths.

For use in carbon dioxide photo-reduction reaction, the above porous $Ga_2O_3$ nanobeams made and heat treated at 800° C. was placed as a powder (50 mg) in a mixed solution of $Na_2SO_3$ ($H^+$ sacrificial agent) and $KIO_3$ (to enhance the solubility of $CO_2$) exposed to UV light. This solution can effectively enhance the surface reaction via consuming the photo-generated charges and repressing recombination on the surface. The main product of $CO_2$ reduction was CO with a high selectively (about 95%) over a three hour period. The normalized production of CO reached 69 µmol $g^{-1}hour^{-1}$, which is the highest reported rate among non-enzymatic semiconductors and other $Ga_2O_3$ catalysts. Although not wishing to be bound by any theory, the improvements in $CO_2$ reduction appear to be due to a combination of high surface area and pore structure of the nanobeams. At longer reaction times from two to three hours, significant amounts of hydrogen and methane gas were generated, perhaps due to saturation of CO in solution.

The thermal treatment also can be used to produce a thermally treated metal oxide material that is useful as a semiconductor with tunable conductivity, degree of doping and defect density such that electron mobility is significantly different than in analogous thin film products.

Anaerobic Heat Treatment:

The material comprising the Ga-containing coordination polymer material described above synthesized using particles made by the SLICE technique can be heat treated under anaerobic conditions that promote incomplete ablation of the organic ligands of the material to form a carbon-containing layer or coating on the internal and external surfaces of the material as well as to increase porosity of the material. In this example, heating produced thermal degradation of the material as a continuum that started at about 300° C. when a color change was first observed and that grew into graphitic structures around 600° C. The carbon-containing layer or coating can comprise a graphitic layer that includes, but is not limited to graphite, graphene, and other forms of mixed-oxidation states of carbon. The color and photo-absorptivity of the material can be tuned by the anaerobic heat treatment.

For purposes of illustration and not limitation, samples of the Ga-based coordination polymer material were heated at different temperatures of 120° C., 300° C., and 450° C. in an anaerobic atmosphere (e.g. argon) and exhibited a color change from white to dark gray/black due to graphitic coating formation, FIG. 5. FIG. 6 shows UV-vis absorption versus wavelength of similar polymer samples heat treated at the different temperatures shown from 300° C. and 800° C. in an anaerobic atmosphere (e.g. argon). Solid state (SS) NMR analysis of the samples confirms the presence of carbon at the zero oxidation state in the vicinity of Ga sites and disappearance of acetate ligands upon heat treatment.

This anaerobic heat treatment provides means for tuning the color, UV absorptivity, and electrical conductivity of the 2D or 3D coordination polymer material. Such tuning of properties renders the anaerobic thermally treated material to be a prime candidate for use in sensors. Moreover, electrical conductivity can be increased to the extent that the material resulting from the anaerobic heat treatment is highly electrically conductive and can provide a starting point material for high-electron mobility semiconductors such as heterostructure field emission transistors.

Practice of the present invention provides a frugal approach to synthesizing 1D coordination polymer nano-beams that exploits in some embodiments liquid metal bodies, with their passivating oxide, to maintain steady state concentration during coordination polymerization. Produced nanobeams can be easily converted into 2D or 3D mesoporous oxides with tunable size and porosity by heat treatment. The resulting mesoporous metal oxide materials showed the highest catalytic activity in photo-reduction of $CO_2$ to CO among non-enzymatic semiconducting catalyst. Production of methane also improved over time. Practice of the present invention can be extended to a large variety of other metals, potentially unravelling unprecedented assembly of catalytic materials.

Although the invention has been described with respect to certain illustrative embodiments, those skilled in the art will appreciate that changes and modification can be made in these embodiments within the scope of the invention as set forth in the appended claims.

REFERENCES, WHICH ARE INCORPORATED HEREIN BY REFERENCE

1. Gratzel, M., Photoelectrochemical cells. *Nature* 2001, 414, 6.
2. A. Fujishima; K. Honda, Electrochemical Photolysis of Water at a Semiconductor Electrode. *Nature* 1972, 238 (5358), 2.
3. Boddy, P. J., Oxygen Evolution on Semiconducting TiO2. *J. Electrochem. Soc.* 1968, 115,
4. M. R. Hoffmann; S. T. Martin; W. Choi; D. W. Bahnemann, Environmental applications of semiconductor photocatalysis. *Chem. Rev.* 1995, 95, 27.
5. Y. Wang, Y. H., W. Ho, L. Zhang, Z. Zou, S. Lee, Biomolecule-controlled hydrothermal synthesis of C—N—S-tridoped TiO 2 nanocrystalline photocatalysts for NO removal under simulated solar light irradiation. *J. Hazard Mater.* 2009, 169, 10.
6. C. Su; C.-M. Tseng; L.-F. Chen; B.-H. You; B.-C. Hsu; Chen, S.-S., Sol-hydrothermal preparation and photocatalysis of titanium dioxide. *Thin Solid Films* 2006, 498 (6), 259.
7. A. Amtout; Leonelli, R., Optical properties of rutile near its fundamental band gap. *Phys. Rev. B: Cond. Matter* 1995, 51, 9.
8. S. N. Frank; Bard, A. J., Heterogeneous photocatalytic oxidation of cyanide ion in aqueous solutions at titanium dioxide powder. *Journal of the American Chemical Society* 1977, 99, 2.
9. Yun Jeong Hwang; Akram Boukai; Yang, P., High Density n-Si/n-TiO2 Core/Shell Nanowire Arrays with Enhanced Photoactivity. *Nano Lett.* 2009, 9 (1), 5.
10. Graeme Williams; Seger, B.; Kamat, P. V., TiO2-Graphene Nanocomposites. UV-Assisted Photocatalytic Reduction of Graphene Oxide. *ACS Nano* 2008, 2 (7), 4.
11. Vaidyanathan Subramanian; Eduardo Wolf; Kamat, P. V., Semiconductor-Metal Composite Nanostructures. To What Extent Do Metal Nanoparticles Improve the Photocatalytic Activity of TiO2 Films? *J. Phys. Chem. B* 2001, 105 (46), 7.

12. Clemens Burda; Yongbing Lou; Xiaobo Chen; Anna C. S. Samia; John Stout; Gole, J. L., Enhanced Nitrogen Doping in TiO2 Nanoparticles. *Nano Letters* 2003, 3 (8), 2.
13. Jimmy C. Yu; Jiaguo; Wingkei; Zitao; Lizhi, Effects of F-doping on the photocatalytic activity and microstructures of nanocrystalline TiO2 powders. *Chem. Mater.* 2002, 14 (9), 9.
14. Teruhisa Ohno; Takahiro Mitsui; Matsumura, M., Photocatalytic Activity of S-doped TiO2 Photocatalyst under Visible Light. *Chem. Lett.* 2003, 32 (4), 2.
15. W. Choi; A. Termin; Hoffmann, M. R., The role of metal ion dopants in quantum-sized TiO2: correlation between photoreactivity and charge carrier recombination dynamics. *J. Phys. Chem. B* 1994, 98, 10.
16. T. Tachikawa; M. Fujitsuka; Majima, T., Mechanistic insight into the TiO2 photocatalytic reactions: design of new photocatalysts. *J. Phys. Chem. C* 2007, 111, 16.
17. A. Fujishima; X. Zhang; D. A. Tryk, TiO2 photocatalysis and related surface phenomena. *Surf. Sci. Reports* 2008, 63, 67.
18. A. V. Emeline; V. N. Kuznetsov; V. K. Rybchuk; N. Serpone, Visible-Light-Active Titania Photocatalysts: The Case of N-Doped s-Properties and Some Fundamental Issues. *International Journal of Photoenergy* 2008.
19. N. Suzuki; S. Ohira; M. Tanaka; T. Sugawara; K. Nakajima; Shishido, T., Fabrication and characterization of transparent conductive Sn-doped β-Ga2O3 single crystal. *Phys. Status Solidi C* 2007, 4
20. M. Mohamed; C. Janowitz; I. Unger; R. Manzke; Z. Galazka; R. Uecker; R. Fornari; J. R. Weber; J. B. Varley; Walle, C. G. V. d., The electronic structure of β-Ga2O3. *Appl. Phys. Lett.* 2010, 97.
21. T. Yanagida; Sakata, Y.; Imamura, H., Photocatalytic decomposition of H2O into H2 and O2 over Ga2O3 loaded with NiO. *Chem. Lett.* 2004, 33, 2.
22. Xiang, W.; Qian, X.; Mingrun, L.; Shuai, S.; Xiuli, W.; Yaochuan, W.; Zhaochi, F.; Jingying, S.; Hongxian, H.; Can, L., Photocatalytic Overall Water Splitting Promoted by an α-β phase Junction on Ga2O3. *Angewandte Chemie International Edition* 2012, 51 (52), 4.
23. Y. Hou; J. Zhang; Ding, Z.; Wu, L., Synthesis, characterization and photocatalytic activity of β-Ga2O3 nanostructures. *Powder Technol.* 2010, 203, 6.
24. S. J. Chang; Y. L. Wu; W. Y. Weng; Y. H. Lin; W. K. Hsieh; J. K. Sheu; Hsuc, C. L., Ga2O3 Films for Photoelectrochemical Hydrogen Generation. *Journal of The Electrochemical Society* 2014, 161 (9), 3.
25. Y. Hou; J. Zhang; Z. Ding; Wu, L., Synthesis, characterization and photocatalytic activity of β-Ga2O3 nanostructures. *Powder Technology* 2010, 203, 5.
26. Oshima, T.; Kaminaga, K.; Mashiko, H.; Mukai, A.; Sasaki, K.; Masui, T.; Kuramata, A.; Yamakoshi, S.; Ohtomo, A., β-Ga2O3 Single Crystal as a Photoelectrode for Water Splitting. *Japanese Journal of Applied Physics* 2013, 52 (11R), 111102.
27. Changli Li; Takashi Hisatomi; Osamu Watanabe; Mamiko Nakabayashi; Naoya Shibata; Domen, K.; Delaunay, J.-J., Positive onset potential and stability of Cu2O-based photocathodes in water splitting by atomic layer deposition of a Ga2O3 buffer layer. *Energy Environ. Sci.* 2015, 8.
28. Hisatomi, T.; Brillet, J.; Cornuz, M.; Le Formal, F.; Tetreault, N.; Sivula, K.; Gratzel, M., A Ga2O3 underlayer as an isomorphic template for ultrathin hematite films toward efficient photoelectrochemical water splitting. *Faraday Discussions* 2012, 155 (0), 223-232.
29. Shrestha, N. K.; Lee, K.; Kirchgeorg, R.; Hahn, R.; Schmuki, P., Self-organization and zinc doping of Ga2O3 nanoporous architecture: A potential nano-photogenerator for hydrogen. *Electrochemistry Communications* 2013, 35, 112-115.
30. Weiyan Guo; Yating Guo; Dong, H.; Zhou, X., Tailoring the electronic structure of b-Ga2O3 by non-metal doping from hybrid density functional theory calculations. *Phys. Chem. Chem. Phys.* 2015, 17.
31. Yoshihisa Sakata; Yuta Matsuda; Takashi Yanagida; Katsumasa Hirata; Hayao Imamura; Teramura, K., Effect of Metal Ion Addition in a Ni Supported Ga2O3 Photocatalyst on the Photocatalytic Overall Splitting of H2O. *Catal Lett* 2008, 125, 4.
32. C. H. Liang; G. W. Meng; G. Z. Wang; Y. W. Wang; L. D. Zhang; Zhang, S. Y., Catalytic synthesis and photoluminescence of beta-Ga2O3 nanowires. *Appl. Phys. Lett.* 2001, 78, 2.
33. Y. H. Gao; Y. Bando; T. Sato; Y. F. Zhang; Gao, X. Q., Synthesis, Raman scattering and defects of beta-Ga2O3 nanorods. *Appl. Phys. Lett.* 2002, 81, 2.
34. J. Zhang; F. H. Jiang; Y. D. Yang; J. P. Li; 13143-13147., Catalyst-assisted vapor-liquid-solid growth of single-crystal Ga2O3 nanobelts. *J. Phys. Chem. B* 2005, 109, 4.
35. L. Fu; Y. Q. Liu; P. Hu; K. Xiao; G. Yu; D. B. Zhu, Ga2O3 nanoribbons: synthesis, characterization, and electronic properties, *Chem. Mater.* 2003, 15, 4.
36. Shaoqing Jin; Xiang Wang; Xiuli Wang; Minggang Ju; Shuai Shen; Wanzhen Liang; Yi Zhao; Zhaochi Feng; Helen Y. Playford; Richard I. Walton; Li, C., Effect of Phase Junction Structure on the Photocatalytic Performance in Overall Water Splitting: Ga2O3 Photocatalyst as an Example. *J. Phys. Chem. C* 2015, 119, 7.
37. Ariga, K.; Vinu, A.; Yamauchi, Y.; Ji, Q.; Hill, J. P., Nanoarchitectonics for Mesoporous Materials. *Bulletin of the Chemical Society of Japan* 2012, 85 (1), 1-32.
38. Davis, M. E., Ordered porous materials for emerging applications. *Nature* 2002, 417 (6891), 813-821.
39. Yan, S.; Wan, L.; Li, Z.; Zhou, Y.; Zou, Z., Synthesis of a mesoporous single crystal Ga2O3 nanoplate with improved photoluminescence and high sensitivity in detecting CO. *Chemical Communications* 2010, 46 (34), 6388-6390.
40. Muruganandham, M.; Amutha, R.; Wahed, M. S. M. A.; Ahmmad, B.; Kuroda, Y.; Suri, R. P. S.; Wu, J. J.; Sillanpaa, M. E. T., Controlled Fabrication of α-GaOOH and α-Ga2O3 Self-Assembly and Its Superior Photocatalytic Activity. *The Journal of Physical Chemistry C* 2012, 116 (1), 44-53.
41. Girija, K.; Thirumalairajan, S.; Patra, A. K.; Mangalaraj, D.; Ponpandian, N.; Viswanathan, C., Enhanced photocatalytic performance of novel self-assembled floral β-Ga2O3 nanorods. *Current Applied Physics* 2013, 13 (4), 652-658.
42. Huang, C.-C.; Yeh, C.-S., GaOOH, and [small beta]- and [gamma]-Ga2O3 nanowires: preparation and photoluminescence. *New Journal of Chemistry* 2010, 34 (1), 103-107.
43. López, I.; Utrilla, A. D.; Nogales, E.; Méndez, B.; Piqueras, J.; Peche, A.; Ramirez-Castellanos, J.; González-Calbet, J. M., In-Doped Gallium Oxide Micro- and Nanostructures: Morphology, Structure, and Luminescence Properties. *The Journal of Physical Chemistry C* 2012, 116 (6), 3935-3943.
44. Lueangchaichaweng, W.; Brooks, N. R.; Fiorilli, S.; Gobechiya, E.; Lin, K.; Li, L.; Parres-Esclapez, S.; Javon, E.; Bals, S.; Van Tendeloo, G.; Martens, J. A.; Kirschhock, C. E. A.; Jacobs, P. A.; Pescarmona, P. P., Gallium Oxide Nanorods: Novel, Template-Free Synthesis and High Catalytic Activity in Epoxidation Reactions. *Angewandte Chemie International Edition* 2014, 53 (6), 1585-1589.
45. Girija, K.; Thirumalairajan, S.; Avadhani, G. S.; Mahgalaraj, D.; Ponpandian, N.; Viswanathan, C., Synthesis, morphology, optical and photocatalytic performance of nanostructured beta-Ga2O3. *Materials Research Bulletin* 2013, 48 (6), 2296-2303.
46. Quan, Y.; Fang, D.; Zhang, X.; Liu, S.; Huang, K., Synthesis and characterization of gallium oxide nanowires via a hydrothermal method. *Materials Chemistry and Physics* 2010, 121 (1-2), 142-146.
47. Zhao, Y.; Frost, R. L.; Martens, W. N., Synthesis and Characterization of Gallium Oxide Nanostructures via a Soft-Chemistry Route. *The Journal of Physical Chemistry C* 2007, 111 (44), 16290-16299.
48. Chun, H. J.; Choi, Y. S.; Bae, S. Y.; Seo, H. W.; Hong, S. J.; Park, J.; Yang, H., Controlled Structure of Gallium Oxide Nanowires. *The Journal of Physical Chemistry B* 2003, 107 (34), 9042-9046.
49. Roy, R.; Hill, V. G.; Osborn, E. F., Polymorphism of Ga2O3 and the System Ga2O3-H2O. *Journal of the American Chemical Society* 1952, 74 (3), 719-722.
50. Kim, S.-W.; Iwamoto, S.; Inoue, M., Solvothermal oxidation of gallium metal. *Ceramics International* 2009, 35 (4), 1603-1609.
51. Li, L.; Wei, W.; Behrens, M., Synthesis and characterization of α-, β-, and γ-Ga2O3 prepared from aqueous solutions by controlled precipitation. *Solid State Sciences* 2012, 14 (7), 971-981.
52. Mensinger, Z. L.; Wang, W.; Keszler, D. A.; Johnson, D. W., Oligomeric group 13 hydroxide compounds-a rare but varied class of molecules. *Chemical Society Reviews* 2012, 41 (3), 1019-1030.
53. Reinsch, H.; De Vos, D., Structures and properties of gallium-MOFs with MIL-53-topology based on aliphatic linker molecules. *Microporous and Mesoporous Materials* 2014, 200 (0), 311-316.
54. Volkringer, C.; Meddouri, M.; Loiseau, T.; Guillou, N.; Marrot, J.; Férey, G.; Haouas, M.; Taulelle, F.; Audebrand, N.; Latroche, M., The Kagomé Topology of the Gallium and Indium Metal-Organic Framework Types with a MIL-68 Structure: Synthesis, XRD, Solid-State NMR Characterizations, and Hydrogen Adsorption. *Inorganic Chemistry* 2008, 47 (24), 11892-11901.
55. Banerjee, D.; Kim, S. J.; Wu, H.; Xu, W.; Borkowski, L. A.; Li, J.; Parise, J. B., Anionic Gallium-Based Metal-Organic Framework and Its Sorption and Ion-Exchange Properties. *Inorganic Chemistry* 2011, 50 (1), 208-212.
56. Mensinger, Z. L.; Zakharov, L. N.; Johnson, D. W., Synthesis and Crystallization of Infinite Indium and Gallium Acetate 10 Chain Structures and Concomitant Ethyl Acetate Hydrolysis. *Inorganic Chemistry* 2009, 48 (8), 3505-3507.
57. Tevis, I. D.; Newcomb, L. B.; Thuo, M., Synthesis of Liquid Core Shell Particles and Solid Patchy Multicomponent Particles by Shearing Liquids Into Complex Particles (SLICE). *Langmuir* 2014, 30 (47), 14308-14313.
58. Cademartiri, L.; Thuo, M. M.; Nijhuis, C. A.; Reus, W. F.; Tricard, S.; Barber, J. R.; Sodhi, R. N. S.; Brodersen, P.; Kim, C.; Chiechi, R. C.; Whitesides, G. M., Electrical Resistance of AgTS-S(CH2)n-1CH3/Ga2O3/EGaIn Tunneling Junctions. *Journal of Physical Chemistry C* 2012, 116 (20), 10848-10860.
59. Reus, W. F.; Thuo, M. M.; Shapiro, N. D.; Nijhuis, C. A.; Whitesides, G. M., The SAM, Not the Electrodes, Dominates Charge Transport in Metal-Monolayer//Ga2O3/Gallium-Indium Eutectic Junctions. *ACS Nano* 2012, 6 (6), 4806-4822.
60. Dickey, M. D., Emerging Applications of Liquid Metals Featuring Surface Oxides. *ACS Applied Materials & Interfaces* 2014, 6 (21), 18369-18379.
61. Dickey, M. D.; Chiechi, R. C.; Larsen, R. J.; Weiss, E. A.; Weitz, D. A.; Whitesides, G. M., Eutectic gallium-indium (EGaIn): a liquid metal alloy for the formation of stable structures in microchannels at room temperature. *Advanced Functional Materials* 2008, 18 (7), 1097-1104.
62. Baes, C. F.; Mesmer, R. E., *The hydrolysis of cations*. Wiley: 1976.
63. Baes, C. F. J.; Mesmer, R. E., Thermodynamics of cation hydrolysis. *Journal Name: Am. J. Sci.*; (United States); Journal Volume: 281:7, Medium: X; Size: Pages: 935-962.
64. Wang, X.; Jin, S. Q.; An, H. Y.; Wang, X. L.; Feng, Z. C.; Li, C., Relation between the Photocatalytic and Photoelectrocatalytic Performance for the Particulate Semiconductor-Based Photoconversion Systems with Surface Phase Junction Structure. *Journal of Physical Chemistry C* 2015, 119 (39), 22460-22464.
65. Grinis, L.; Dor, S.; Ofir, A.; Zaban, A., Electrophoretic deposition and compression of titania nanoparticle films for dye-sensitized solar cells. *Journal of Photochemistry and Photobiology a-Chemistry* 2008, 198 (1), 52-59.
66. Fernandez, J. L.; Bard, A. J., Scanning electrochemical microscopy. 47. Imaging electrocatalytic activity for oxygen reduction in an acidic medium by the tip generation-substrate collection mode. *Analytical Chemistry* 2003, 75 (13), 2967-2974.
67. Fernandez, J. L.; Bard, A. J., Scanning electrochemical microscopy 50. Kinetic study of electrode reactions by the tip generation-substrate collection mode. *Analytical Chemistry* 2004, 76 (8), 2281-2289.
68. Jung, C. H.; Sanchez-Sanchez, C. M.; Lin, C. L.; Rodriguez-Lopez, J.; Bard, A. J., Electrocatalytic Activity of Pd—Co Bimetallic Mixtures for Formic Acid Oxidation Studied by Scanning Electrochemical Microscopy. *Analytical Chemistry* 2009, 81 (16), 7003-7008.
69. Wain, A. J., Imaging size effects on the electrocatalytic activity of gold nanoparticles using scanning electrochemical microscopy. *Electrochimica Acta* 2013, 92, 383-391.
70. Weng, Y.-C.; Hsieh, C.-T., Scanning electrochemical microscopy characterization of bimetallic Pt-M (M=Pd, Ru, Ir) catalysts for hydrogen oxidation. *Electrochimica Acta* 2011, 56 (5), 1932-1940.
71. Mirkin, M. V.; Nogala, W.; Velmurugan, J.; Wang, Y., Scanning electrochemical microscopy in the 21st century. Update 1: five years after. *Physical Chemistry Chemical Physics* 2011, 13 (48), 21196-21212.
72. Zhou, X.; Gossage, Z. T.; Simpson, B. H.; Hui, J.; Barton, Z. J.; Ródriguez-López, J., Electrochemical Imaging of Photoanodic Water Oxidation Enhancements on TiO2 Thin Films Modified by Subsurface Aluminum Nanodimers. *ACS Nano* 2016, 10 (10), 9346-9352.
73. Park, H. A.; Choi, J. H.; Choi, K. M.; Lee, D. K.; Kang, J. K., Highly porous gallium oxide with a high CO2 affinity for the photocatalytic conversion of carbon dioxide into methane. *Journal of Materials Chemistry* 2012, 22 (12), 5304-5307.

We claim:

1. A method of making an organo-metal material, comprising:

A providing a metal ion source comprising a Ga—In eutectic alloy in an aqueous acidic medium comprising a carboxylic acid comprising acetic acid or propionic acid to remove metal ions from the source and form 1D metal-containing coordination polymers, the 1D metal-containing coordination polymers comprising the metal ion and a chelating ligand that is a conjugate base of the carboxylic acid, which self-assemble and precipitate as at least one of a 2D and 3D coordination polymer material; and thermally treating the coordination polymer material to form a porous ß-$Ga_2O_3$ having high surface area and mesoporous with radius of 2-10 nm material, the thermally treating comprising a temperature of 300° C. to 1000° C.

2. The method of claim 1 wherein metal ions are removed from the source by an etching component of the medium, wherein the etching component comprises the carboxylic acid or a conjugate acid-base pair comprising a conjugate base of the carboxylic acid.

3. The method of claim 1 wherein the metal ion source comprises a metal particle or metal body.

4. The method of claim 3 wherein the metal particles are reacted in an aqueous acidic solution to form 1 D metal-containing coordination polymers that grow by coordination polymerization and self-assemble as at least one of a 2D and 3D coordination polymer material.

5. The method of claim 1 wherein self-assembly can be tuned through organization of a coordination sphere leading to self-assembly of a 3D high aspect material of different shape.

6. The method of claim 5 wherein the material is a beam-like material with a square or rectangular cross-section.

7. The method of claim 6 wherein the beam-like material having the rectangular cross-section is thin enough to comprise a sheet or film.

8. The method of claim 5 wherein a single layer of the beam-like material is isolated as a 2D material.

9. The method of claim 5 wherein two dissimilar ligands of metal-containing species are bonded orthogonal to each other in a square bipyramidal geometry around a metal center.

10. The method of claim 9 wherein the two dissimilar ligands interact via two different types of secondary bonds.

11. The method of claim 5 wherein the rate of self-assembly is governed by the secondary bonds formed between peripheral moieties of chelating ligands such that differential strength in these bonds leads to control over the cross-sectional shape of a resulting 3D beam.

12. The method of claim 5 wherein the organo-metal material comprises solvent molecules of the medium.

13. The method of claim 5 where the coordination geometry around the metal center is square bipyramidal, trigonal bipyramidal or other geometries such that resulting directionality of secondary bonds between the ligands induce a different shape.

14. The method of claim 13 where the resulting shape is a beam, a rod, a twisted rod, or a sheet.

15. The method of claim 13 where the coordination geometry is controlled through stoichiometry and/or stereoelectronic structure.

16. The method of claim 1 where the material has multiple metal centers, either forming as a component of the same or different coordination polymer chains.

17. The method of claim 16 where different metal centers are assembled in a uniform manner across the material.

18. The method of claim 1 where porosity of the resulting porous ß-$Ga_2O_3$ material can be tuned from nano- to meso-scale dimensions.

19. The method of claim 18 where multiple levels of porosity are realized such that nanometer pores are localized on the regions that are sintered and/or coalesced, while the larger pores are localized near the regions.

20. The method of claim 19 where the porosity is tuned through degree of sintering and/or coalescence leading to oxide domains in the nano- to micro-scale in length.

21. The method of claim 20 wherein the porous ß-$Ga_2O_3$ material has a 3D interconnected porous network.

22. The method of claim 1 where the resulting porous ß-$Ga_2O_3$ material is a semiconductor with tunable conductivity, degree of doping and defect density such that electron mobility is significantly different than in analogous thin film products.

23. The method of claim 1, wherein the method comprises the thermal treatment of the coordination polymer porous ß-$Ga_2O_3$ material to form the carbon-containing layer on surfaces of the porous ß-$Ga_2O_3$ material.

24. The method of claim 23 wherein thermally treating occurs in an anaerobic atmosphere.

25. The method of claim 1, wherein the method further comprising forming an organo-metal structure by:

shearing liquid metal particles in aqueous acidic medium to:
(i) selectively form thin metal oxide-acetate layer on the surface of the particles, wherein the medium is the aqueous acidic medium and wherein the metal ion source is the metal oxide-acetate layer,
(ii) dissolve the oxide-acetate layer into the aqueous acidic medium to provide dissolved metal-acetate species, and
(iii) grow from the metal-acetate species coordination polymers that self-assemble, due to solubility (ΔGm) and/or a polymerization-induced self-assembly (PISA) process, and precipitate as an organo-metal structure, wherein the metal-acetate species coordination polymers are the 1D metal-containing coordination polymers, and wherein the organo-metal structure is the 2D and/or 3D coordination polymer material.

26. The method of claim 1, wherein the coordination polymer material has a nanobeam shape, wherein during the thermal treatment comprising treatment to 1000° C. the formed porous ß-$Ga_2O_3$ material retains the nanobeam shape.

27. The method of claim 1, wherein the thermally treating comprises a temperature of 300° C. to 800° C.

28. The method of claim 1, wherein the thermally treating comprises a temperature of A 300° C. to 800° C.

29. The method of claim 1, wherein the thermally treating comprises a temperature of A 30° C. to 450° C.

* * * * *

UNITED STATES PATENT AND TRADEMARK OFFICE
CERTIFICATE OF CORRECTION

| | | |
|---|---|---|
| PATENT NO. | : 11,241,678 B2 | Page 1 of 1 |
| APPLICATION NO. | : 15/932805 | |
| DATED | : February 8, 2022 | |
| INVENTOR(S) | : Thuo et al. | |

It is certified that error appears in the above-identified patent and that said Letters Patent is hereby corrected as shown below:

On the Title Page

On page 2, in Column 2, under "Other Publications", Line 18, delete "microindentaiton" and insert --microindentation-- therefor On page 3, in Column 1, under "Other Publications", Line 29, delete "acorss" and insert --across-- therefor On page 3, in Column 2, under "Other Publications", Line 9, delete "bsed" and insert --based-- therefor In the Specification In Column 8, Line 46, delete "and$^{71/69}$Ga)" and insert --and $^{71/69}$Ga)-- therefor In Column 13, Line 53, delete "10" and insert --1D-- therefor In the Claims In Column 15, Line 4, in Claim 1, before "providing", delete "A"

In Column 16, Line 59, in Claim 28, after "of", delete "A"

In Column 16, Line 61, in Claim 29, delete "A 30° C." and insert --300° C.-- therefor Signed and Sealed this
Eighteenth Day of October, 2022

Katherine Kelly Vidal
*Director of the United States Patent and Trademark Office*